United States Patent
Park

(10) Patent No.: US 7,564,507 B2
(45) Date of Patent: Jul. 21, 2009

(54) APPARATUS FOR DISPLAYING THREE-DIMENSIONAL IMAGE

(75) Inventor: Tae Soo Park, Seoul (KR)

(73) Assignee: LG Electronics Inc., Seoul (KR)

( * ) Notice: Subject to any disclaimer, the term of this patent is extended or adjusted under 35 U.S.C. 154(b) by 1232 days.

(21) Appl. No.: 10/790,226

(22) Filed: Mar. 2, 2004

(65) Prior Publication Data

US 2004/0174472 A1 Sep. 9, 2004

(30) Foreign Application Priority Data

Mar. 3, 2003 (KR) ........................ 10-2003-0013084

(51) Int. Cl.
*G02F 1/1335* (2006.01)
(52) U.S. Cl. .............................. 349/15; 349/95; 349/57
(58) Field of Classification Search .................... 349/15, 349/95, 57
See application file for complete search history.

(56) References Cited

U.S. PATENT DOCUMENTS 6,144,426 A * 11/2000 Yamazaki et al. ............. 349/95
6,822,707 B2 * 11/2004 Ariyoshi et al. ............. 349/112
2003/0016444 A1 1/2003 Brown et al. ................. 359/462
2004/0150767 A1 * 8/2004 Kim ............................. 349/74

OTHER PUBLICATIONS

Chinese Office Action dated Feb. 9, 2007.

* cited by examiner

*Primary Examiner*—James A Dudek
(74) *Attorney, Agent, or Firm*—KED & Associates, LLP

(57) ABSTRACT

Disclosed is an apparatus for displaying a three-dimensional image by using a lenticular lens sheet formed by an alignment of a plurality of lenticular lens pieces for providing three-dimensional image with an enhanced level of visual ambience, the apparatus including a flat display device displaying a plurality of perspective views from different directions; and a lenticular lens sheet including a plurality of lenticular lens pieces of which Y-axis being parallel to a vertical axis of the flat display, the plurality of lenticular lens pieces forming a plurality of lines being parallel to a horizontal axis of the flat display device on a front surface of the flat display device, each of the plurality of lines being shifted to a predetermined distance.

14 Claims, 3 Drawing Sheets

APPARATUS FOR DISPLAYING THREE-DIMENSIONAL IMAGE

CROSS-REFERENCE TO RELATED APPLICATIONS

This application claims the benefit of Korean Application No. P2003-13084, filed on Mar. 3, 2003, which is hereby incorporated by reference as if fully set forth herein.

BACKGROUND OF THE INVENTION

1. Field of the Invention

The present invention relates to a three-dimensional image, and more particularly, to an apparatus for displaying a three-dimensional image with a lenticular lens sheet formed by an alignment of a plurality of lenticular lens pieces for providing the three-dimensional image with an enhanced level of visual ambience when a user watches a movie.

2. Discussion of the Related Art

Recently, demands for an apparatus displaying a realistic three-dimensional image are increased. In general, in embodying a three-dimensional image, a different image is reached to left and right eyes of a viewer, a brain of the viewer converges the two different images thereby the viewer feels a cubic effect.

For producing the three-dimensional image as described above, a device is needed for separating an image into a left-eye image and a right-eye image. Among such devices, there is a conventional apparatus for linearly polarizing three-dimensional image, the apparatus separating an image into a left image and a right image such that different images are reached to left and right eyes through a use of the three-dimensional glasses.

However, a system for displaying the three-dimensional image through the use of the three-dimensional glasses has a disadvantage that a user needs to wear the three-dimensional glasses. Accordingly, a development of a new system is proposed for enabling to display the three-dimensional image without using the three-dimensional glasses.

Such system is coupled with a flat display device such as an LCD (Liquid Crystal Display) or a PDP (Plasma Display Panel) for separating images in different directions. In this case, according to the device for separating images in different directions, various types of an Auto-Stereoscopy system are proposed such as a lenticular system using a lenticular lens sheet, a parallax system using a slit array sheet, an integral photography system using a micro-lens array sheet, and a holography system using an interference phenomenon. However, each of the system has advantages and disadvantages.

Among such systems, the integral photography system and the holography system are well known for a characteristic of displaying parallax in all directions compared to other systems displaying the three-dimensional image only by the horizontal parallax, the parallax including horizontal parallax.

Accordingly, each of the systems described above is known as one of best systems for copying an environment of an object viewed from the viewer in three-dimensional space. However, an amount of data to be processed is massive thereby in reality, it is possible to realize the system in far future.

Meanwhile, in case of the lenticular system using the lenticular lens, the three-dimensional image is produced by preparing at least two perspective views taken from different directions, and periodically sampling and multiplexing the perspective views.

In this case, if possible, many perspective views are employed for enlarging the three-dimensional space wherein the user sees and feels three-dimensionally. However, the two-dimensional flat display being a common device for displaying the image has a predetermined number of pixels for displaying the image. Accordingly, resolution of the three-dimensional image is lowered in inverse proportion to the number of employed perspective views taken in different directions. Therefore, the number of perspective views taken in different directions is determined in consideration of the resolution (number of pixels) of the flat display.

The system described above can also be divided into a first one (hereinafter abbreviated vertical system) of which Y direction of the lenticular lens is parallel to a vertical direction of the flat display, and a second one (hereinafter abbreviated incline system) being inclined to a predetermined angle.

Among those, in a case of the apparatus for displaying the three-dimensional image, the apparatus employing the vertical system, the more the lenticular lens includes perspective views, the lower the resolution becomes.

In the apparatus for displaying a three-dimensional image employing the proposed lenticular lens of the incline system, the loss of the horizontal resolution is compensated up and down owing to the incline system compared to the vertical system.

However, the perspective view is not exactly separated in a vertical direction, but inclined at a predetermined angle and then separated. Therefore, the perspective view has a disadvantage in that the viewer needs to lean a head of the viewer to a predetermined degree for observing.

Furthermore, by leaning as described above, the perspective view is separated thus the area to observe the three-dimensional image is reduced, compared to a case of using the lenticular plate pieces of vertical system.

SUMMARY OF THE INVENTION

Accordingly, the present invention is directed to an apparatus for displaying a three-dimensional image that substantially obviates one or more problems due to limitations and disadvantages of the related art.

An object of the present invention is to provide an apparatus for displaying a three-dimensional image by using a lenticular lens sheet formed by an alignment of a plurality of lenticular lens pieces for providing three-dimensional image with an enhanced level of visual ambience.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for displaying a three-dimensional image includes a flat display device displaying a plurality of perspective views from different directions; and a lenticular lens sheet including a plurality of lenticular lens pieces of which Y-axis being parallel to a vertical axis of the flat display, the plurality of lenticular lens pieces forming a plurality of lines being parallel to a horizontal axis of the flat display device on a front surface of the flat display device, each of the plurality of lines being shifted to a predetermined distance.

A size of each lens piece of the lenticular lens sheet is $$\text{Width }(P_h) = \frac{3.5\,p(D-d)}{3D},\ \text{Length }(P_v) = \frac{p(D-d)}{D},$$

Wherein, (P: a length of a pixel in a horizontal direction, D: a distance between a viewer and the flat display device, d: a distance between the flat display device and the lenticular lens sheet).

The predetermined distance in each line ⅙ p (p: a length of a pixel in a horizontal direction).

The lenticuler lens sheet is aligned at a predetermined distance from the flat display device 10 so as to focus the flat display device 10 on the image.

The flat display device is an LCD or a PDP.

In another aspect of the present invention, an apparatus for displaying a three-dimensional image includes a flat display device displaying a plurality of perspective views taken from different directions; and a lenticular lens sheet including a plurality of lenticular lens pieces arrayed on a front surface of the flat display device in a horizontal direction, the arrayed lenticuler lens pieces forming a plurality of lines parallel to the horizontal axis of the flat display device.

By the present invention, the three-dimensional space the user can feel cubic effect is broaden and lowering of the resolution is complemented. Therefore, the characteristic of the three-dimensional image is provided with an enhanced level of visual ambience.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, an apparatus for displaying a three-dimensional image of the present invention is described in detail in reference to appended drawings.

Figure 1:
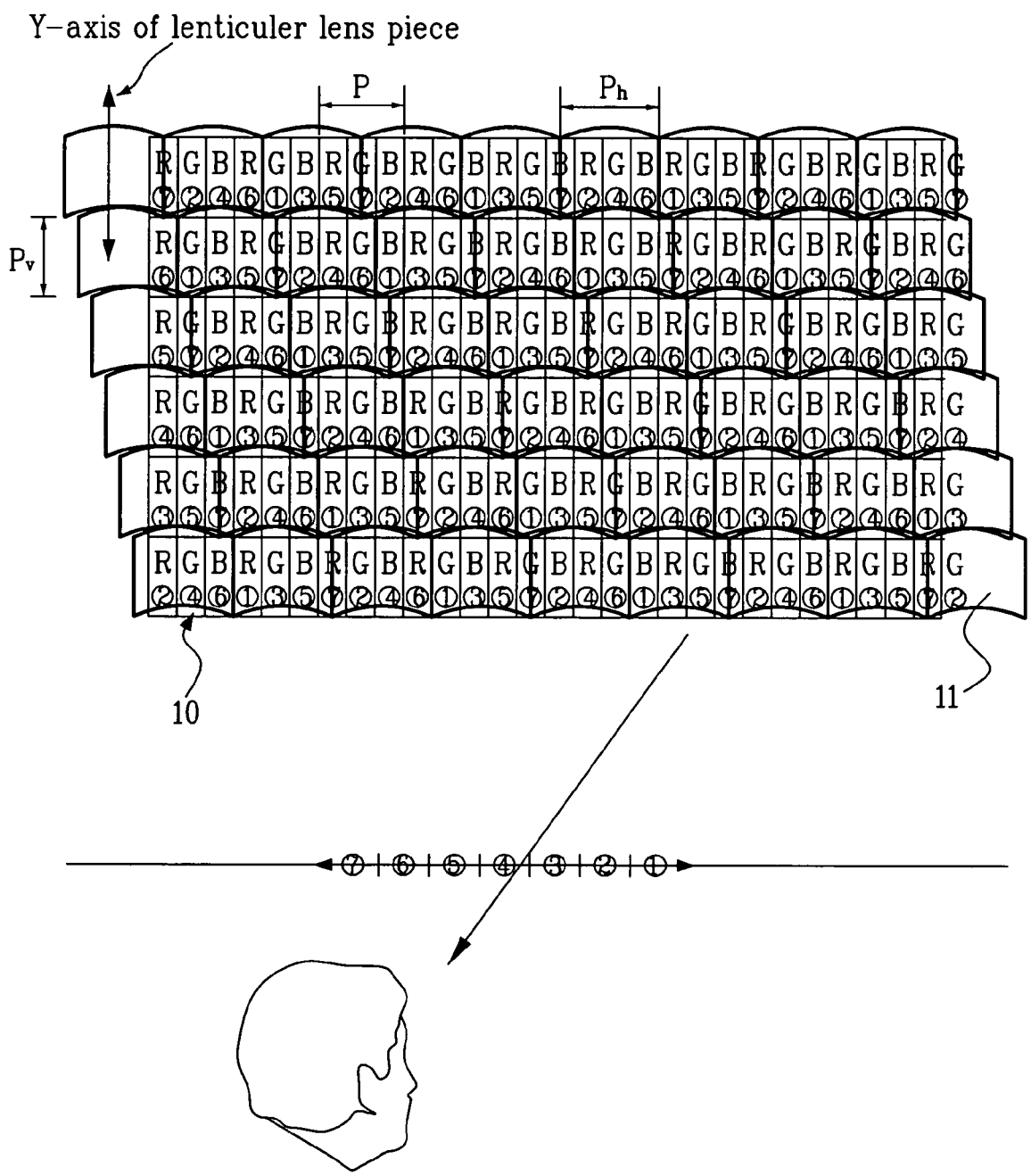
FIG. 1 illustrates a diagram showing a structure of an apparatus for displaying a three-dimensional image using a lenticular sheet of an incline system, and a method for separating a perspective view in accordance with the present invention.

FIG. 1 illustrates a diagram showing a structure of a apparatus for displaying a three-dimensional image using a lenticular plate of an incline system, and a method for separating a perspective view in accordance with the present invention.

As illustrated, the apparatus for displaying a three-dimensional image of the present invention includes a flat display device 10 and a lenticular plate 11. For manufacturing the apparatus for displaying a three-dimensional image of the lenticular system, first, a lenticular image is aligned on a flat display device 10 of which images of left and right are separated.

Therefore, in order to precisely align the lenticular sheet, the apparatus for displaying a three-dimensional image is realized such a flat display device 10 as an LCD or a PDP/6. The flat display device 10 displays a plurality of perspective views by sampling and multiplexing.

In this case, the perspective view is an image obtained by moving a camera to a left or right little by little or by moving a subject little by little while filming an image. The lenticular lens plate 11 is provided in front of the flat display device 10 and includes a plurality of lenticular plate pieces aligned in a vertical direction.

In this instance, the lenticular lens plate 11 is provided at a predetermined distance from the flat display device 10 so as to focus the flat display device 10 on the image//7. In this case, the Y-axis of the lenticular lens is provided to be parallel to the vertical direction.

In FIG. 1, the flat display device displays, for example, each pixel as seven perspective views in different directions. Each pixel includes sub-pixels of R, G, and B.

The number of the perspective view by direction, according to the principle of the present invention, can be increased or decreased. If the number of the perspective views by direction is increased, the three-dimensional space wherein the viewer can enjoy the three-dimensional image becomes larger, but the resolution is lowered.

Therefore, the viewer, in consideration of the three-dimensional space and the resolution, is required to set the number of the perspective view taken in different directions. In this case, sampling and multiplexing is performed on the image with seven perspective views by direction. In FIG. 1, number 1, 2, 3, 4, 5, 6, and 7 represent the perspective view taken in different directions.

The multiplexed perspective view in different directions passes through the lenticular lens. Each image is passed through the lens plate 11 and proceeded to different directions thereby the viewer feels cubic effect.

The perspective view taken in seven directions is separated in order of 7, 6, 5, 4, 3, 2, and 1, and displayed in the three-dimensional space. In this case, the three-dimensional space means a range of the viewer feeling the cubic effect on the apparatus for displaying a three-dimensional image.

Therefore, in the three-dimensional space, both eyes of the viewer perceive different images, and a brain of the viewer converges the images so as to perceive the images as the three-dimensional images.

In this case, a location and the range the viewer for feeling the cubic effect, and a degree of the cubic effect are determined by characteristics of curvature, thickness, and uniformity of the lenticular lens sheet 11.

In this case, the Y-axis of the lenticular lens plate 11 is parallel to the vertical direction of the flat display device 10 because the perspective views taken in different directions are separated in the horizontal direction so as to be perceived.

A horizontal size (Pv) and a vertical size (Ph) of the lenticular lens piece are represented as follows.

$$\text{Width } (P_h) = \frac{3.5\,p(D-d)}{3D}, \text{ Length } (P_v) = \frac{p(D-d)}{D}$$

In this case, P is a width of each pixel on the flat display device 10, D is a length between the viewer and the flat display device 10, and d is a distance between the flat display device 10 and the lenticular lens plate.

A size of the lenticular lens piece is proportion to a size of the pixel on the flat display. Each of the lenticular lens pieces is aligned in a horizontal direction, and the alignment includes a plurality of vertical lines thereby the lenticular lens sheet is produced.

In this instance, in the alignment of the lenticular lens piece, a bottom line is moved/to a right side of a top line.

In FIG. 1, as an example, the bottom line is moved as much as ⅙ p. In other words, the lenticular plate is moved and formed on each horizontal line as ling as a length correspondent to half/9 of each sub pixel (R, G, B).

As described above, during the alignment of the lenticular lens piece, by moving the lenticular lens piece to the right side, a same effect is obtained as that of the related art the apparatus for displaying a three-dimensional image of the incline system of which Y-axis is inclined to a predetermined direction.

There is a disadvantage of the apparatus for displaying a three-dimensional image of the vertical system in that with more pixels corresponding to the lenticular lens, although the resolution of the vertical direction remains the same, the horizontal resolution is lowered to 1/n (n: number of the perspective view taken in different directions).

Figure 2:
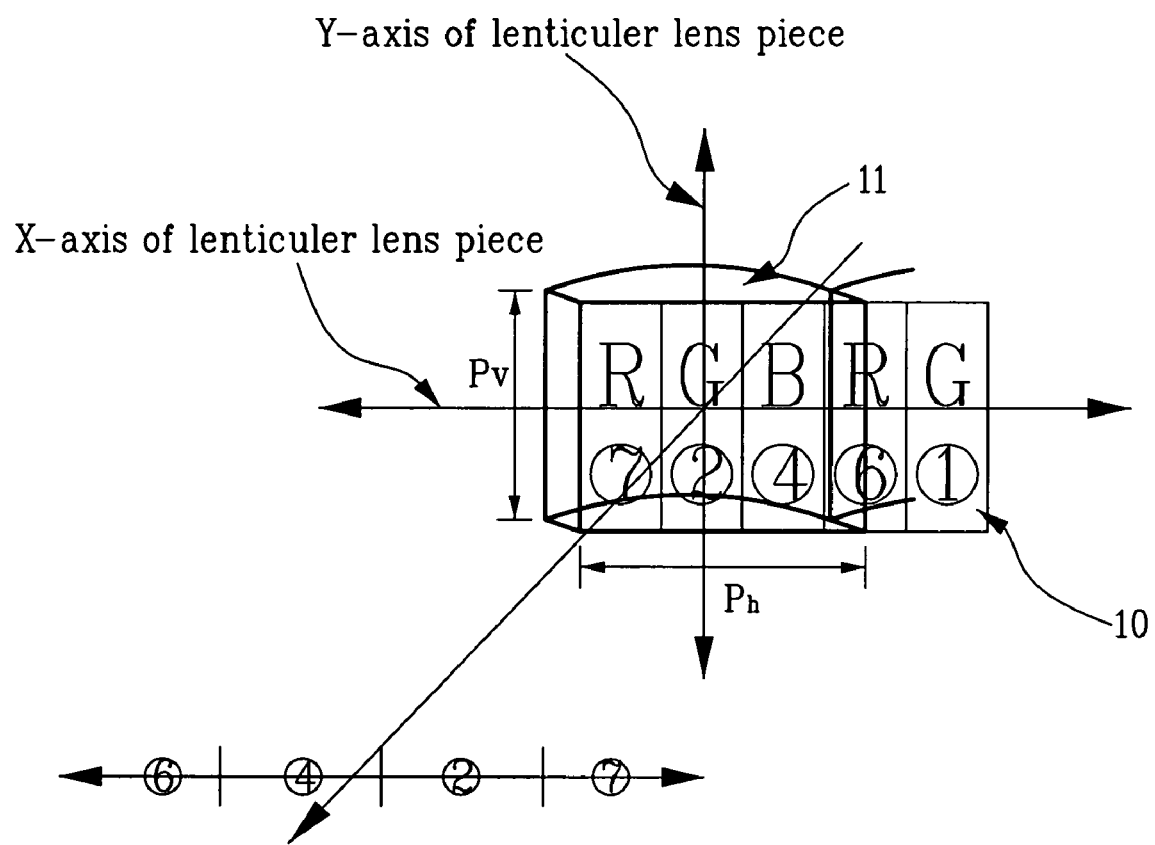
FIG. 2 illustrates a diagram showing a perspective view separated in different directions by a lenticular lens piece in an apparatus for displaying a three-dimensional image in accordance with the present invention.

FIG. 2 illustrates a diagram showing a separation of a perspective view by a piece of lenticular lens in an apparatus for displaying a three-dimensional image.

As illustrated in the drawing, the Y-axis of one lenticular lens piece is parallel to the vertical axis of the flat display device 10.

In the same manner, the X-axis of the lenticular lens is parallel to the horizontal direction of the flat display device 10.

In this case, by the effect of the lenticular lens, the pixel on a left side is seen only by the right eye of the viewer and the pixels on the right side are seen only by a left eye of the viewer.

Therefore, the perspective view taken in different directions corresponding to the lenticular lens is separated in the horizontal direction of the lenticuler lens and the perspective views are separated in the order of ⑦, ②, ④, and ⑥.

Figure 3:
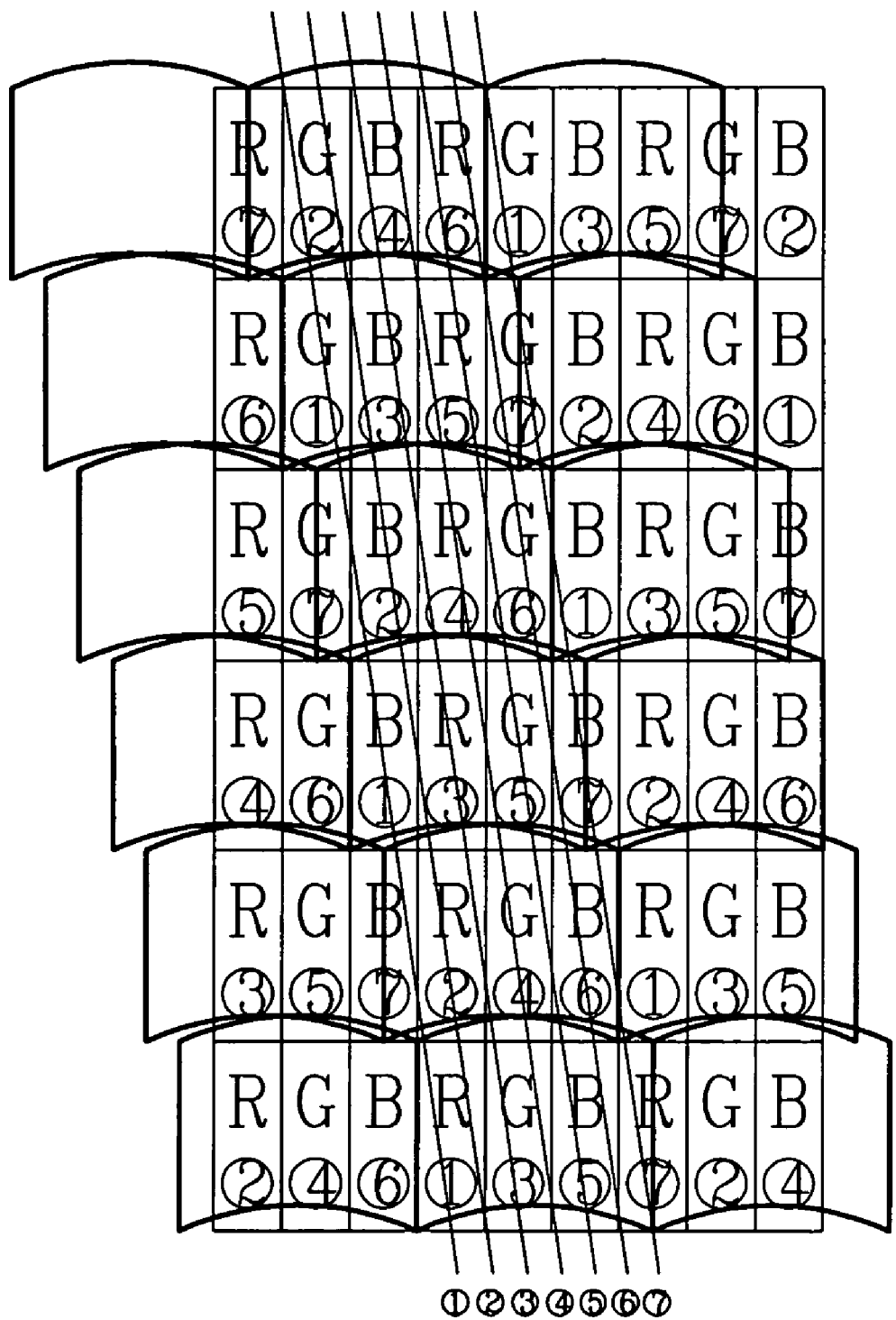
FIG. 3 illustrates a magnified diagram showing a perspective view separated in different directions by a lenticular lens piece in an apparatus for displaying a three-dimensional image in accordance with the present invention.

FIG. 3 illustrates a diagram showing a separation of a perspective view in an apparatus for displaying a three-dimensional image in accordance with the present invention.

As illustrated in the drawing, after being sampled and multiplexed, the perspective views ②, ④, ⑥, ①, ③, ⑤, and ⑦ repeatedly displayed on the flat display device. The perspective views taken in different directions is separated in the order of ①, ②, ③, ④, ⑤, ⑥, and ⑦. The separated perspective view is perceived by the viewer in the order of ⑦, ⑥, ⑤, ④, ③, ②, and ① in the horizontal direction in the three-dimensional space.

Therefore, contrary to the related art of the incline system, the viewer can enjoy the three-dimensional image without leaning the head of the viewer and the three-dimensional space is widen by being separated horizontally.

As described above, the apparatus for displaying a three-dimensional image as an effect as follows. First, the Y-axis of the lenticular lens sheet is aligned by lenticular pieces parallel to the vertical axis of the flat display device 10. The alignment of the lenticular lens piece forms a plurality of horizontal line.

Therefore, by separating the perspective view by direction in the horizontal direction in the three-dimensional space, the viewer can enjoy the three-dimensional image with an enhanced ambience without leaning the head forward.

The lenticular lens sheet is inclined shifting the lenticular lens piece in the horizontal direction. Therefore, a disadvantage of the vertical lenticular lens of the related art lowering the horizontal resolution is prevented.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for displaying a three-dimensional image, comprising:
    a flat display device displaying a plurality of perspective views from different directions; and
    a lenticular lens sheet including a plurality of lenticular lens pieces of which Y-axis being parallel to a vertical axis of the flat display, the plurality of lenticular lens pieces forming a plurality of lines parallel to a horizontal axis of the flat display device on a front surface of the flat display device, each of the plurality of lines being shifted a predetermined distance, wherein the plurality of lines have an odd line and an even line, a boundary region between a first lenticular lens piece and a second lenticular lens piece in the odd line is positioned at a center region of a pixel of the flat display device, and a boundary region between a first lenticular lens piece and a second lenticular lens piece in the even line is positioned to an edge region of a pixel of the flat display device.

2. The apparatus for displaying the three-dimensional image of claim 1, wherein a width $P_h$ and a length $P_y$ of the lenticular lens piece is determined by the following equations:

$$(P_h) = \frac{3.5\,p(D-d)}{3D}, (P_v) = \frac{p(D-d)}{D},$$

where p is a length of a pixel in a horizontal direction, D is a predetermined distance between a viewer and the flat display device, and d is a distance between the flat display device and the lenticular lens sheet.

3. The apparatus for displaying the three-dimensional image of claim 1, wherein the predetermined distance in each line is changed according to a resolution of the three-dimensional image that the viewer wants to describe.

4. The apparatus for displaying the three-dimensional image of claim 1, wherein the predetermined distance in each line is ⅙ p, where p is a length of a pixel in a horizontal direction.

5. The apparatus for displaying the three-dimensional image of claim 1, wherein the parallax image is displayed in a horizontal direction of the flat display device.

6. The apparatus for displaying the three-dimensional image of claim 1, wherein the lenticuler lens sheet is aligned at a predetermined distance from the flat display device so as to focus the flat display device on the image.

7. The apparatus for displaying the three-dimensional image of claim 1, wherein the flat display device is an LCD or a PDP.

8. An apparatus for displaying a three-dimensional image, comprising:
- a flat display device displaying a plurality of perspective views taken from different directions; and
- a lenticular lens sheet including a plurality of lenticular lens pieces arrayed on a front surface of the flat display device in a horizontal direction, the arrayed lenticuler lens pieces forming a plurality of lines parallel to a horizontal axis of the flat display device, wherein a width Ph and a length Py of the lenticular lens piece is determined by the following equations, $$(P_h) = \frac{3.5\, p(D-d)}{3D}, \text{ and } (P_v) = \frac{p(D-d)}{D},$$

where p is a length of a pixel in the horizontal direction, D is a predetermined distance between a viewer and the flat display device, and d is a distance between the flat display device and the lenticular lens sheet.

9. The apparatus for displaying the three-dimensional image of claim 8, wherein each of the plurality of lines is shifted a predetermined distance.

10. The apparatus for displaying the three-dimensional image of claim 8, wherein the predetermined distance in each line is changed according to a resolution of the three-dimensional image that the viewer wants to describe.

11. The apparatus for displaying the three-dimensional image of claim 8, wherein the predetermined distance in each line is ⅙ p, where p is a length of a pixel in the horizontal direction.

12. The apparatus for displaying the three-dimensional image of claim 8, wherein the parallax image is represented in the horizontal direction of the flat display device.

13. The apparatus for displaying the three-dimensional image of claim 8, wherein the lenticuler lens sheet is arranged at a predetermined distance from the flat display device so as to focus the flat display device on the image.

14. The apparatus for displaying the three-dimensional image of claim 8, wherein the flat display device is an LCD or a PDP.

* * * * *